US012692903B2

(12) United States Patent
Tschirdewahn et al.

(10) Patent No.: US 12,692,903 B2
(45) Date of Patent: Jul. 28, 2026

(54) CONNECTION ARRANGEMENT FOR AN AGRICULTURAL HARVESTER

(71) Applicant: AGCO International GmbH, Neuhausen (CH)

(72) Inventors: Wilhelm Tschirdewahn, Marktoberdorf (DE); Felix Sodermanns, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 274 days.

(21) Appl. No.: 18/592,726

(22) Filed: Mar. 1, 2024

(65) Prior Publication Data

US 2024/0315160 A1     Sep. 26, 2024

(30) Foreign Application Priority Data

Mar. 23, 2023    (GB) ...................................... 2304241

(51) Int. Cl.
F16D 1/116        (2006.01)
A01D 43/10        (2006.01)
F16D 1/10         (2006.01)

(52) U.S. Cl.
CPC ............ F16D 1/116 (2013.01); A01D 43/105 (2013.01); *F16B 2200/69* (2023.08); *F16D 2001/103* (2013.01); *Y10T 403/7033* (2015.01)

(58) Field of Classification Search
CPC .... A01B 71/06; A01B 71/063; A01D 43/088; A01D 43/105; A01D 43/107; A01F 29/09;

(Continued)

(56) References Cited

U.S. PATENT DOCUMENTS 4,277,956 A  *  7/1981  Lane ......................... F16D 3/06
                                                      464/154
4,277,957 A  *  7/1981  Lane ......................... F16D 3/06
                                                      464/154

(Continued)

FOREIGN PATENT DOCUMENTS

CN        103518480 A      1/2014
DE    102018205284 A1 * 10/2019  .............. F16D 1/116
                        (Continued)

OTHER PUBLICATIONS

UK Intellectual Property Office, Search Report for related GB Application No. GB2304241.9 dated 'Sep. 4, 2023, 3 pages.

*Primary Examiner* — Josh Skroupa

(57) ABSTRACT

A connection arrangement for use in a forage harvester between a feed roller and a gear box has a gearbox shaft with a central through bore is rotatingly supported in a gearbox housing. An outer surface of a distal end of the gearbox shaft has ridges. A feed roller shaft is rotatingly supported and has a central blind bore aligned with the central through bore of the gearbox shaft. An outer surface of a distal end of the feed roller shaft is provided with ridges. A connecting shaft is located within the central bores of the gearbox shaft and the feed roller shaft. A sleeve having internal splines surrounds the distal ends of the gearbox shaft and the feed roller shafts. The splines of the sleeve match the ridges of the gearbox shaft and the feed roller shaft so as to provide torque transmission between the gearbox shaft and the feed roller shaft.

5 Claims, 6 Drawing Sheets

(58) Field of Classification Search
CPC .... A01F 29/14; F16B 2200/69; F16D 1/0864;
F16D 1/108; F16D 1/116; F16D
2001/062; F16D 2001/103; Y10T 403/57;
Y10T 403/5733; Y10T 403/58; Y10T
403/581; Y10T 403/7033; Y10T 403/7067
USPC ..... 464/154; 403/300, 305, 315, 316, 359.5,
403/374.3; 241/35; 56/16.4 B, 16.4 C
See application file for complete search history.

(56) References Cited

U.S. PATENT DOCUMENTS

| | | | | | |
|---|---|---|---|---|---|
| 7,322,174 | B2 | 1/2008 | Desnijder et al. | | |
| 7,717,397 | B2 * | 5/2010 | Campany | .................. | F16D 3/68 |
| | | | | | 464/154 |
| 8,100,601 | B2 | 1/2012 | Pietsch et al. | | |
| 9,010,876 | B2 * | 4/2015 | Stelter | ..................... | B60B 23/00 |
| | | | | | 403/1 |
| 9,192,106 | B2 | 11/2015 | Dreer | | |
| 9,434,252 | B2 * | 9/2016 | Heindl | ................... | B60K 25/00 |
| 9,441,679 | B2 * | 9/2016 | Heindl | ................... | F16D 21/06 |
| 2011/0171047 | A1 * | 7/2011 | Parmeter | ................. | F04B 47/02 |
| | | | | | 29/525.02 |
| 2022/0174874 | A1 * | 6/2022 | Dreer | .................. | A01D 43/105 |

FOREIGN PATENT DOCUMENTS

| | | | | |
|---|---|---|---|---|
| FR | 2664339 A1 * | 1/1992 | .............. | F16D 1/116 |
| GB | 2286107 A | 8/1995 | | |
| WO | 2013/092107 A1 | 6/2013 | | |

* cited by examiner

CONNECTION ARRANGEMENT FOR AN AGRICULTURAL HARVESTER

CROSS-REFERENCE TO RELATED APPLICATIONS

Not applicable.

FIELD

The present invention relates to a connection arrangement between a feed roller and a gear box of an agricultural harvester, for example a forage harvester.

BACKGROUND

It is known to provide an agricultural harvester, for example a forage harvester, with a front attachment which includes a front cutter and a mechanism for feeding the cut crop to compression rolls where the cut crop is compressed. The compressed crop is then fed to a further part of the harvester where the crop is chopped before being fed into a discharge chute.

Such a harvester is known from EP 2 485 574 (AGCO GmbH). However, in this disclosure, it is difficult to achieve easy disassembly of the intake rollers. In particular, the roller shafts engage into the main intake transmission. As such, it is not possible to disassemble the intake rollers for repair or maintenance without disassembly of the main intake gear box. Due to its weight, heavy lifting equipment is required to remove the assembly of the kind that cannot readily be used in a field.

It is an advantage of the present invention that this problem is addressed.

BRIEF SUMMARY

According to a first aspect of the present invention, a connection arrangement between a feed roller and a gear box of a forage harvester comprises
- a gearbox shaft with a central through bore rotatingly supported in a gearbox housing around an axis of rotation, an outer surface of a distal end of the gearbox shaft being provided with ridges;
- a feed roller shaft rotatingly supported around the axis of rotation, the feed roller shaft having a central blind bore aligned with the central through bore of the gearbox shaft, an outer surface of a distal end of the feed roller shaft being provided with ridges;
- a connecting shaft located within the central bores of the gearbox shaft and the feed roller shaft; and
- a sleeve having internal splines, the sleeve surrounding the distal ends of the gearbox shaft and the feed roller shaft wherein the splines match the ridges of the gearbox shaft and the feed roller shaft so as to provide torque transmission between the gearbox shaft and the feed roller shaft;
- and a locking element securing the splined sleeve axially in position about the distal ends of the gearbox shaft and the feed roller shaft.

Preferably, a bearing is provided within the central bore of the feed roller shaft within which the connecting shaft is seated.

Preferably, the connecting shaft is secured axially within the through bore of the gearbox shaft.

Preferably, the connecting shaft is provided with a through bore and a plurality of radially extending shafts.

Preferably, the locking element comprises half rings connected by releasable fasteners, the fasteners extending within the locking element to be seated within a groove formed in the feed roller shaft.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
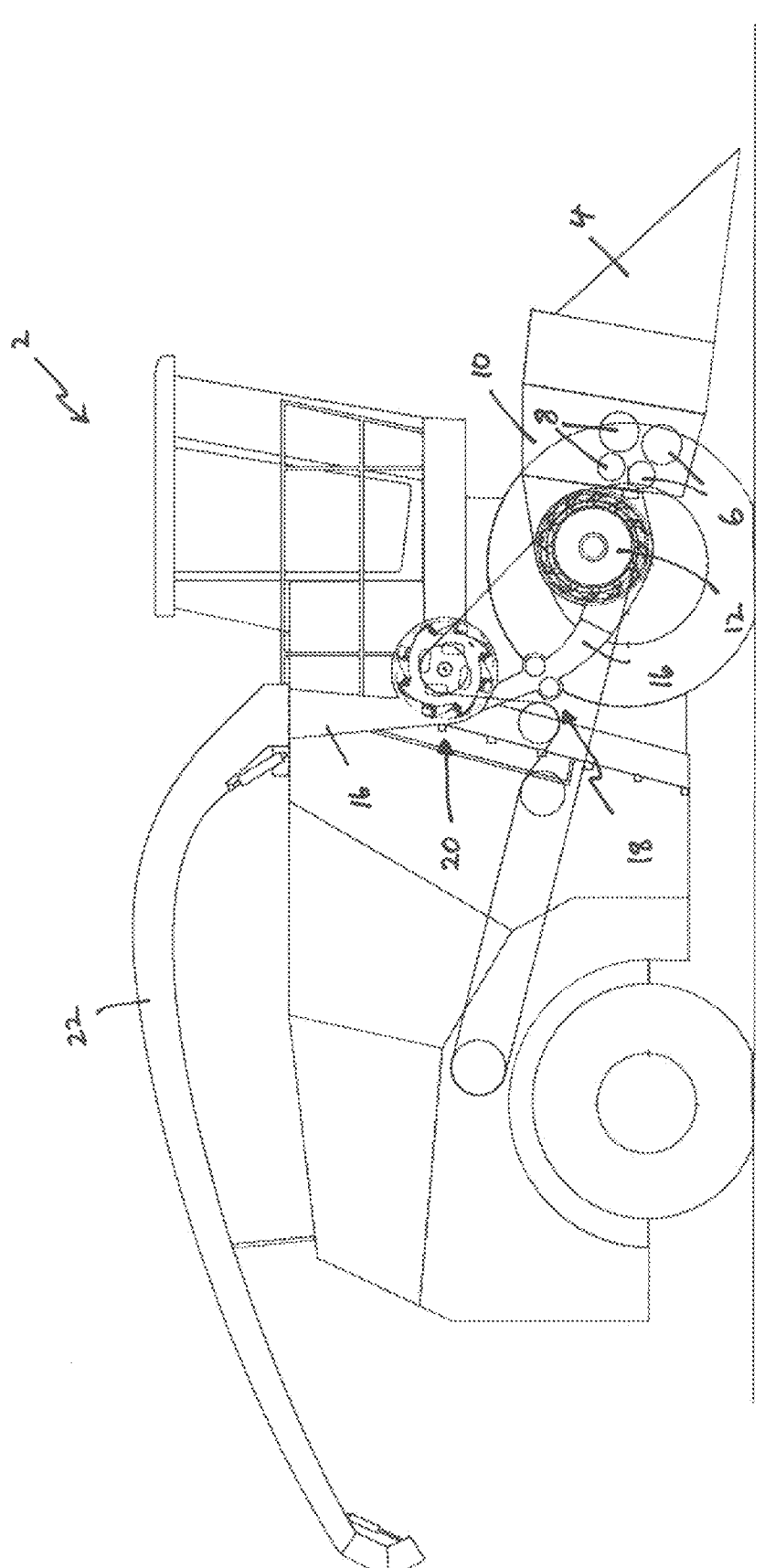
FIG. 1 shows a schematic side view of a forage harvester.

With reference to FIG. 1, a forage harvester 2 is shown provided with a front attachment 4 such as a header which contains cutting equipment for cutting and harvesting a crop. The cut crop is fed from the header via associated lower and upper feed rollers 6,8 in a housing 10 to a chopper drum 12 where the crop is chopped into smaller pieces between the chopper drum 12 and an associated shear bar. The chopped crop passes through a duct 16 and is optionally directed into a cracker unit 18 where the crop is further crushed and threshed. The harvested crop is then blown upwards along the duct 16 by an accelerator 20 and exits through a spout 22 directing the processed crop into a trailer or other vehicle moving alongside the forage harvester 2.

Each of the feed rollers 6,8 comprises a compression drum mounted on a central shaft.

Figure 2:
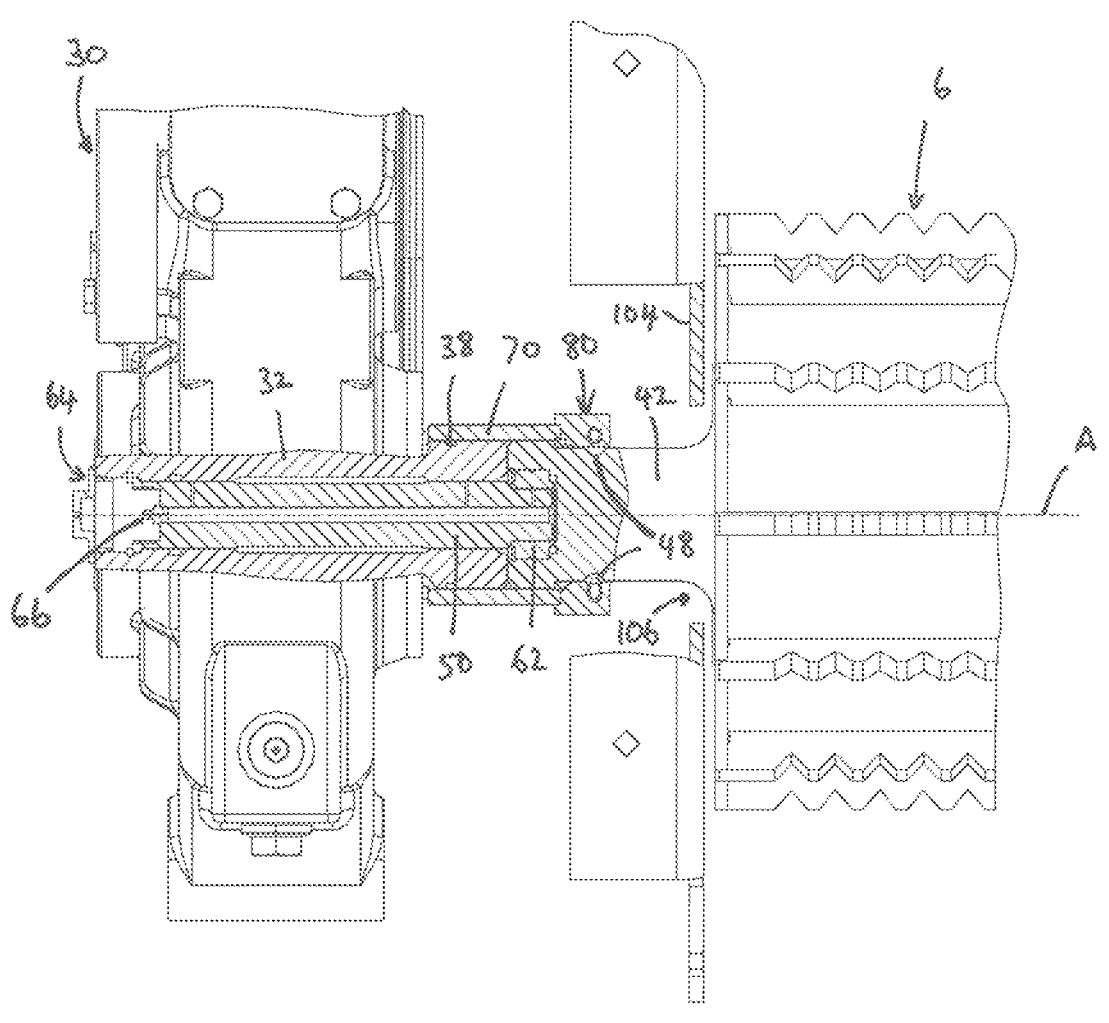
FIG. 2 shows a sectional view of a connection arrangement in accordance with the present invention.
Figure 2A:
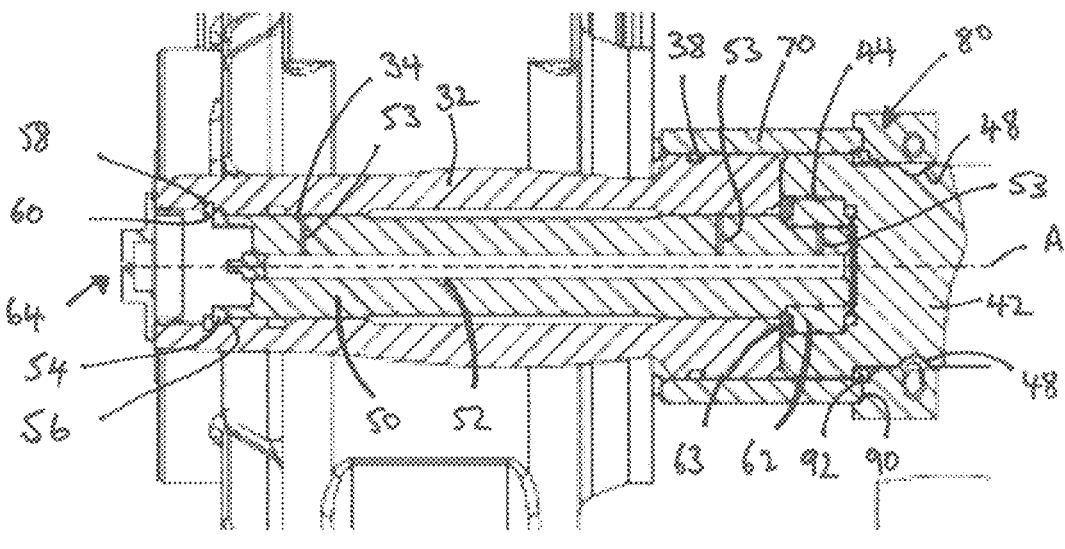
FIG. 2A shows an enlarged view of elements of FIG. 2.

FIGS. 2 and 2A show a cross section of a connection arrangement between a lower front feed roller 6 and a gear box assembly of a forage harvester.

A gearbox shaft 32 with a central through bore 34 (FIG. 2A) is rotatingly supported in a gearbox housing 30 around an axis of rotation A. An outer surface of a distal end of the gearbox shaft 32 is provided with ridges 36 (best shown in FIGS. 6 and 7). The gearbox shaft 32 is additionally provided with a circumferentially extending groove located axially along the gearbox shaft 42 between the ridged portion and the gearbox housing 30. A seal 38, such as an O-ring, is seated within this groove.

Figure 6:
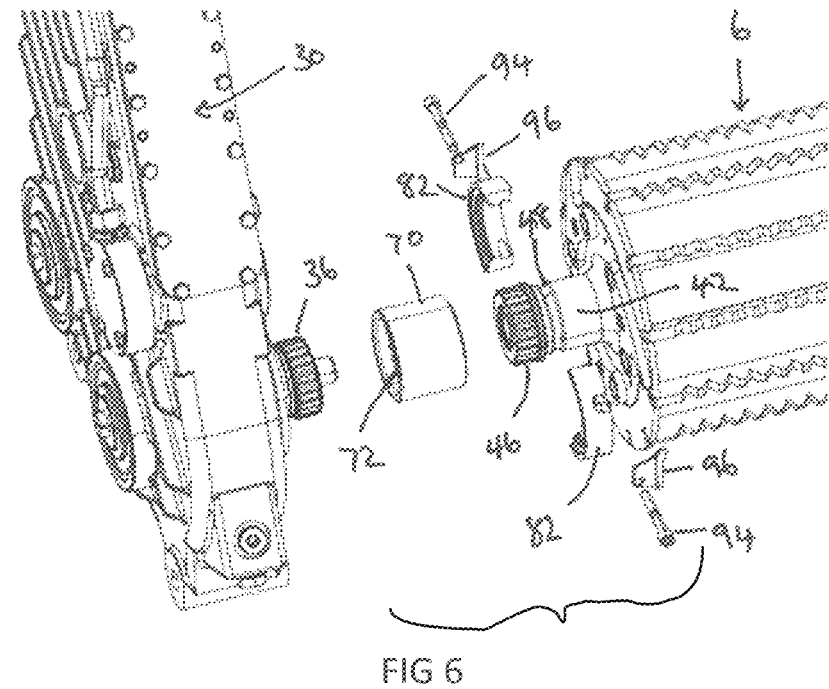
FIG. 6 shows an exploded view of some of the elements of the connection arrangement.

A feed roller shaft 42 of a lower roller 6 is rotatingly supported around the axis of rotation A. The feed roller shaft 42 has a central blind bore 44 axially aligned along the axis of rotation A with the central through bore 34 of the gearbox shaft 32. An outer surface of a distal end of the feed roller shaft 42 is provided with ridges 46 (FIG. 6). The feed roller shaft 42 is additionally provided with a circumferentially extending groove 48 located axially along the feed roller shaft 42 between the ridged portion and the compression drum.

Conveniently, the ridges 36 of the gearbox shaft 32 correspond with the ridges 46 on the feed roller shaft 42.

An internal connecting shaft 50 is located within the central bores 34,44 of the gearbox shaft 32 and the feed roller shaft 42. The internal connecting shaft 50 has a central through bore 52. A first end of the connecting shaft 50 is provided with a radially extending flange 54. When assembled the flange 54 is seated against a shoulder 56 formed in a first end of the through bore 34 of the gearbox shaft 32 and retained in position by a snap ring 60 seated in a groove 58 suitably located in the through bore 34 of the gearbox shaft 32.

A second end of the connecting shaft 50 is of reduced diameter and is seated within an annular bearing 62. The annular bearing 62 is shaped and sized to be seated within the blind bore 44 of the feed roller shaft 42. The annular bearing 62 is retained within the blind bore 44 of the feed roller shaft by a snap ring 63 seated in a groove suitably located at a mouth of the blind bore 44.

The connecting shaft 50 has a plurality of radial channels 53 extending from the through bore 52 to an outer periphery of the connecting shaft 50.

A first end of the gearbox shaft 32 is sealed by a sealing plug 64 and a grease nipple 66 is located at a first end of the through bore 52.

A sleeve 70 having internal splines 72 is provided circumferentially surrounding the distal ends of gearbox shaft 32 and the feed roller shaft 42. The splines 72 match the ridges 36,46 of the gearbox shaft 32 and the feed roller shaft 42 so as to provide torque transmission between the gearbox shaft 32 and the feed roller shaft 42.

It can be seen that the internal connecting shaft 50 does not provide torque transmission between the gearbox shaft 32 and the feed roller shaft 42.

An external locking element 80 is provided to secure the splined sleeve 70 axially in position in position about the distal ends of the gearbox shaft 32 and the feed roller shaft 42. In the illustrated embodiment, the locking element comprises first and second identical semi-circular clamping ring halves 82. Each half is provided with first and second through bores 84,86, one to each side of the ring half 82. The first bore 84 is provided with a recess 88 in an outer periphery of the ring half 82. The second bore 86 is of substantially constant diameter. Each of the first and second through bores 84, 86 extends tangentially across an inner peripheral edge of each half ring 82. At least the second through bore 86 is at least partially threaded. Preferably, each of the through bores 84,86 is threaded.

Each of the ring halves 82 is provided with a circumferentially extending recess 90. As may best be seen in FIG. 2A, when assembled an outer portion of the recess 90 is seated against an outer periphery of a second end of the sleeve 70 and an inner portion of the recess 90 retains a seal 92 between the feed roller shaft 42 and an inner periphery of the second end of the sleeve.

In practice a lubricant is provided to ease relative rotation of the connecting shaft 50 with respect to each of the gearbox shaft 32 and the feed roller shaft 42. The lubricant flows from the through bore 52 of the connecting shaft 50 through radial channels 53 between an outer surface of the connecting shaft 50 and the adjacent inner surfaces of the through bore 34 of the gearbox shaft 32 and an inner surface of the annular bearing 62. The lubricant also penetrates between adjacent ends of the gearbox shaft 32 and the feed roller shaft 42 to their respective ridges 36,46 between the splined sleeve 70 and the respective seals 38, 92.

Figure 9:
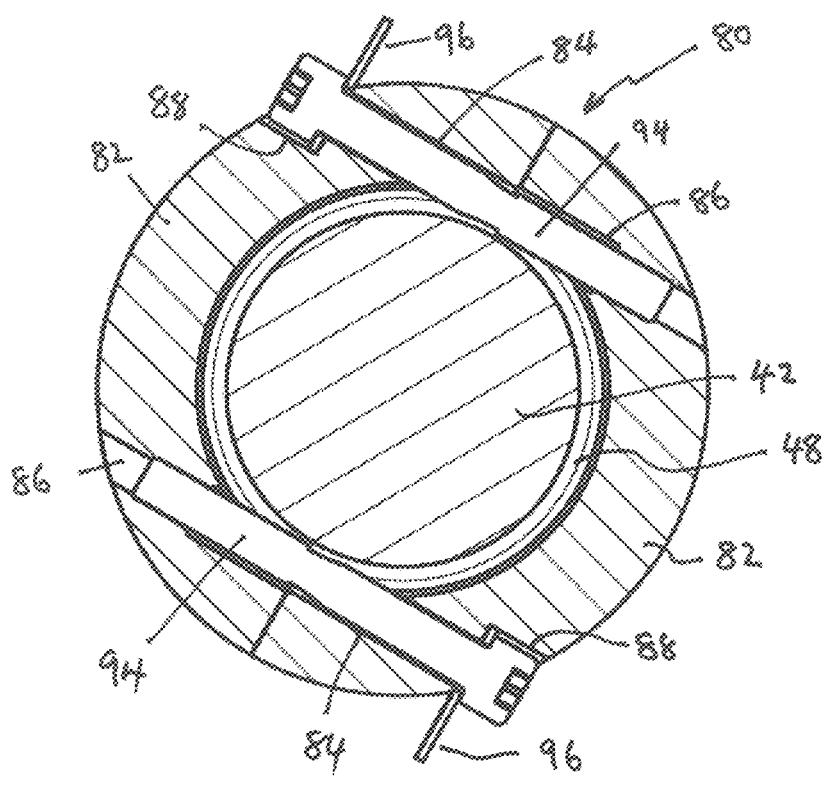
FIG. 9 shows a sectional view of a locking element.

As may be best seen in FIG. 9, the ring halves 82 are located about the feed roller shaft 42 such that the first bore 84 of one is aligned with the second bore 86 of the other. A headed threaded fastener 94, such as a bolt, extends through the first and second bores 84,86 to secure the ring halves 82 to one another. When assembled, shanks of the fasteners 94 are located within the groove 88 in order to retain the locking element 80 radially in position along the feed roller shaft 42. Preferably the portion of each fastener 94 to be seated within the groove 48 is not threaded, but smooth.

Conveniently, lugs 96 may be seated against the recess 88 and secured between a ring half 82 and a head of the headed threaded fastener 92.

Figure 3:
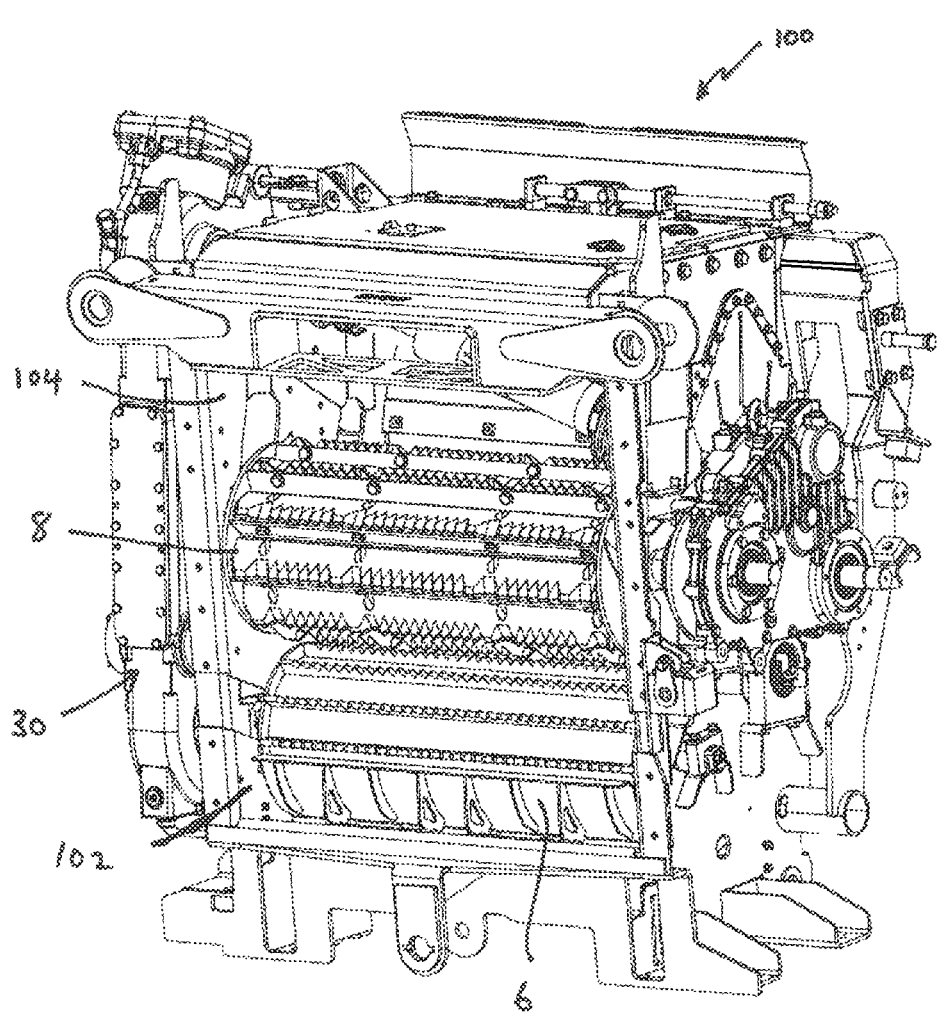
FIG. 3 shows a perspective view of an intake assembly for a forage harvester in which the lower intake rollers have been connected to the gearbox using a connection arrangement in accordance with the present invention.

FIG. 3 shows a perspective view of an intake assembly 100 of a forage harvester. The assembly comprises a housing supporting the lower rollers 6 and the upper rollers 8 in a spaced relationship to one another. A first upper roller and a first lower roller comprise a first working pair of rollers and a second upper roller and a second lower roller comprise a second working pair of rollers.

The intake assembly 100 comprises a front end for connection to the front attachment 4 so that harvested crop can be fed into the intake assembly 100 and a rear end open for attachment to a further part of the forage harvester 2 where the harvester crop is cut. The intake assembly 100 includes side walls each comprising a lower panel 102 and an upper panel 104. Each of the lower side panels has recesses or openings for receiving the shafts of the lower rollers 6. As will be discussed in more detail the shaft of the front lower roller is received in corresponding recesses 106 to each side of the intake assembly 100.

The intake assembly 100 is pivotally mounted to the forage harvester 2 such that the intake assembly can be pivoted about a vertical axis to allow access to a rear of the intake assembly 100.

The first end of the feed roller shaft 42 is retained to a gear box shaft 32 by a connection as described above. A second end of the feed roller shaft 42 is retained in position with respect to the side wall by a flange or roller bearing 108 of a kind known in the art. As such the construction and disassembly of such a bearing will not be described further.

In practice inner wear plates of the kind known from EP 2 485 574 (AGCO GmbH) are fitted to the inside of the side walls of the intake assembly 100. These are releasably attachable and readily removeable. The inner wear plates have been omitted from the drawings for reasons of clarity.

A gear box housing 30 located to one side of the intake assembly 100 is connected to the lower feed rollers 6 in manner that allows a simple disassembly and access to the feed rollers 6 for maintenance and repair of the feed rollers 6. The gearbox converts drive from a drive motor, for example, the internal combustion engine of the forage harvester 2, to drive the feed rollers.

Figure 4:
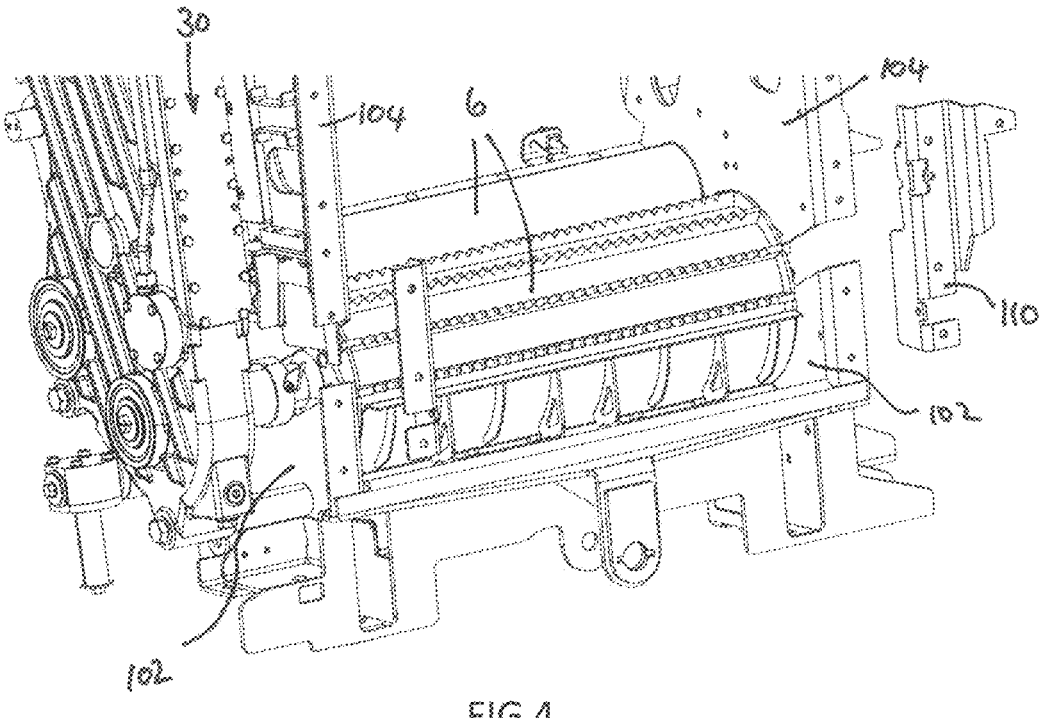
FIG. 4 shows a detail of FIG. 3 in which left and right hand cover members have been removed from a frame of the intake assembly.

In order to disassemble the lower feed roller from the intake assembly as shown in FIGS. 2 and 3, cover elements 110 (FIG. 4) are first removed from the intake assembly to permit access to the recesses 106.

Figure 5:
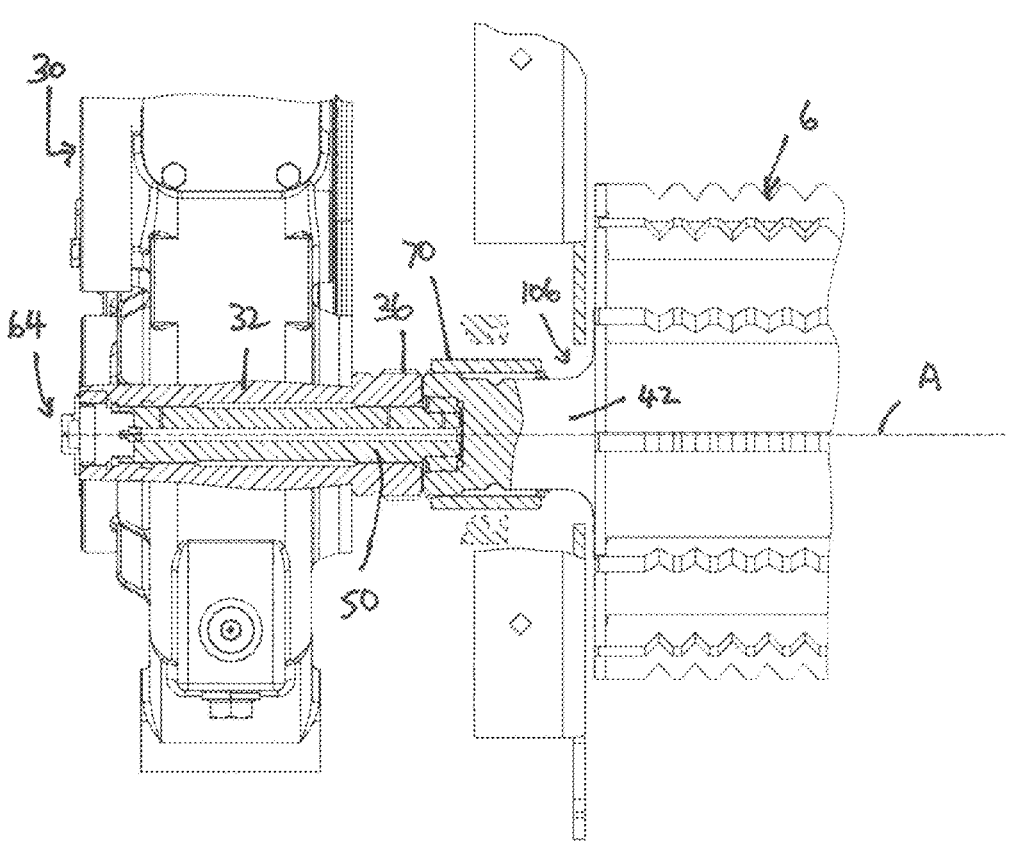
FIG. 5 shows a view similar to FIG. 2 showing partial disassembly of the connection arrangement.

The fasteners 94 are removed from the locking element 80 and the half rings 82 removed from around the feed roller shaft 32 (FIG. 5). Rotation of the lower roller 6 may occur to orient the fasteners 94 into a desired position to facilitate removal of the fasteners 94 and the half rings 82.

Figure 7:
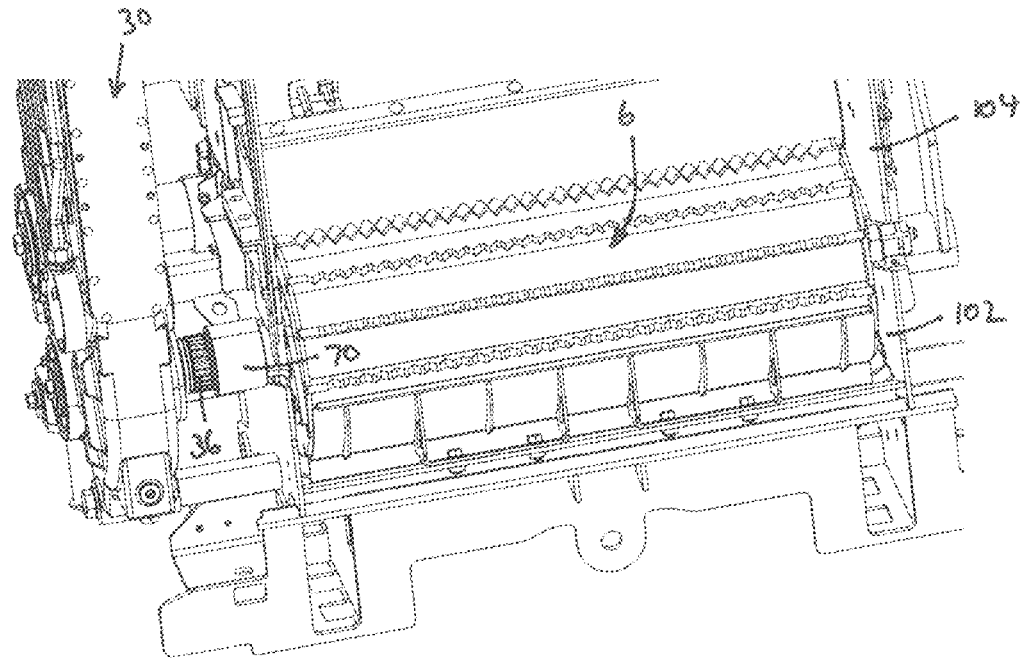
FIG. 7 shows a view of similar to FIG. 4 showing partial disassembly of the connection arrangement.
Figure 8:
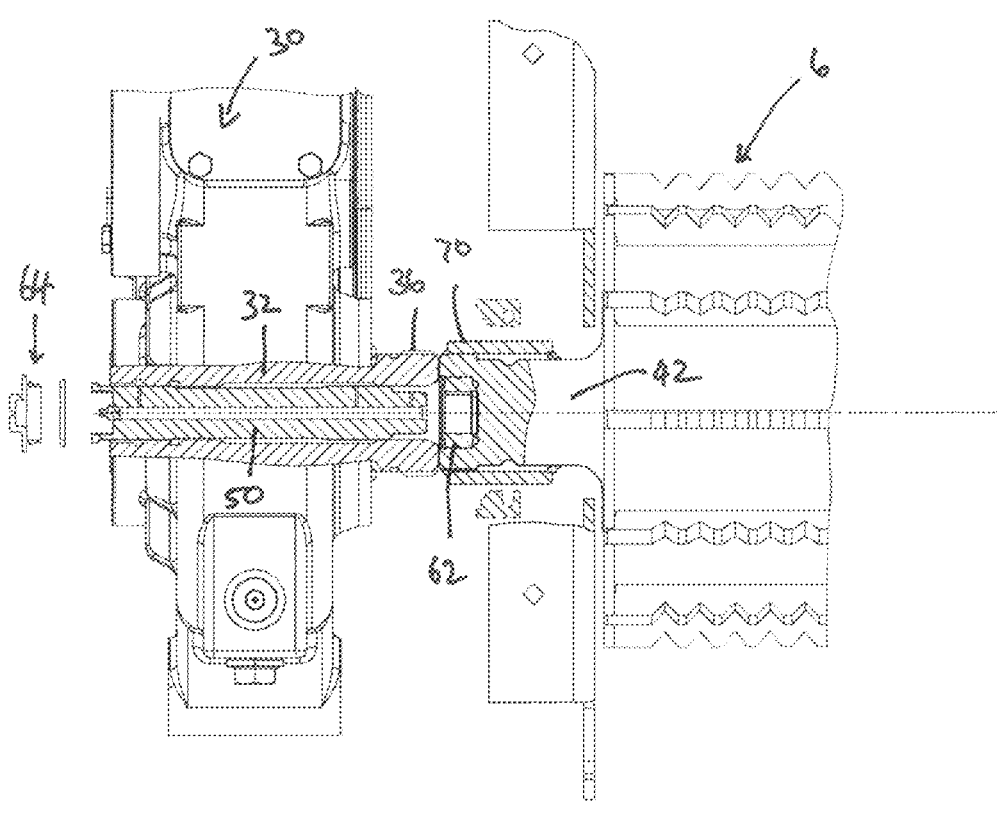
FIG. 8 shows a view similar to FIG. 5 showing further disassembly of the connection arrangement.

Once the locking element has been removed the sleeve 70 may be slid to one side onto the distal end of the feed roller shaft 42 (FIG. 7). Concurrently, the sealing plug 64 at the first end of the gearbox shaft 32 is removed allowing access to and removal of the snap ring 60 axially securing the connecting shaft 50, such that the connecting shaft 50 may be axially withdrawn from the bearing 62 seated in the blind bore 44 of the feed roller shaft 42 into the through bore 34 of the gearbox shaft 32 (FIG. 8).

Once this operation has been completed and the bearing 108 disassembled from the other end of the feed roller shaft 42, the lower front feed roller 6 may be removed from the recesses 106 in the lower panels 102 without removal of the intake assembly 100 from the forage harvester 2 being required.

The rear lower roller shaft may similarly be retained within recesses at the rear of the intake assembly 100 and secured at a first end to a drive shaft by a connection arrangement in accordance with the present invention and at a second end to a roller bearing. Removal of the rear lower roller requires pivoting of the intake assembly 100 and the disassembly of the connection arrangement as described above, disassembly of the roller bearing and then removal of the rear lower roller though suitable rear recesses in the intake assembly 100.

All references cited herein are incorporated herein in their entireties. If there is a conflict between definitions herein and in an incorporated reference, the definition herein shall control.

From reading the present disclosure, other modifications will be apparent to persons skilled in the art. Such modifications may involve other features which are already known in the field of forage harvesters and component parts therefore and which may be used instead of or in addition to features already described herein.

What is claimed is:

1. A connection arrangement between a feed roller and a gear box of a forage harvester comprising:
   a gearbox shaft with a central through bore rotatingly supported in a gearbox housing around an axis of rotation, an outer surface of a distal end of the gearbox shaft being provided with ridges;
   a feed roller shaft rotatingly supported around the axis of rotation, the feed roller shaft having a central blind bore aligned with the central through bore of the gearbox shaft, an outer surface of a distal end of the feed roller shaft being provided with ridges;
   a connecting shaft located within the central bores of the gearbox shaft and the feed roller shaft;
   a sleeve having internal splines, the sleeve surrounding the distal ends of the gearbox shaft and the feed roller shaft wherein the splines match the ridges of the gearbox shaft and the feed roller shaft so as to provide torque transmission between the gearbox shaft and the feed roller shaft; and
   a locking element securing the splined sleeve axially in position about the distal ends of the gearbox shaft and the feed roller shaft.

2. A connection arrangement according to claim 1, characterised in that a bearing is provided within the central bore of the feed roller shaft within which the connecting shaft is seated.

3. A connection arrangement according to claim 1, characterised in that the connecting shaft is secured axially within the through bore of the gearbox shaft.

4. A connection arrangement according to claim 1, characterised in that the connecting shaft is provided with a through bore and a plurality of radially extending channels.

5. A connection arrangement according to claim 1, characterised in that the locking element comprises half rings connected by releasable fasteners, the fasteners extending within the locking element to be seated within a groove formed in the feed roller shaft.

\* \* \* \* \*